United States Patent

Fish et al.

[15] 3,668,533

[45] June 6, 1972

[54] FEEDBACK CONTROL SYSTEMS

[72] Inventors: Percy J. Fish, Bassett; Malcolm B. Clark, Winchester, both of England

[73] Assignee: Plessey Handel und Investments A.G., Zug, Switzerland

[22] Filed: Jan. 11, 1971

[21] Appl. No.: 105,573

[30] Foreign Application Priority Data

Jan. 10, 1970 Great Britain ........................1,307/70

[52] U.S. Cl. ................................328/168, 328/175, 333/16, 325/407

[51] Int. Cl. ..........................................................H04b 3/10

[58] Field of Search .............333/16; 325/407; 328/168, 173, 328/175

[56] References Cited

UNITED STATES PATENTS

| | | | |
|---|---|---|---|
| 2,853,601 | 9/1958 | McKenna et al | 325/407 |
| 1,711,636 | 5/1929 | Eaves | 325/407 |
| 1,743,132 | 1/1930 | Green | 333/16 |
| 2,154,062 | 4/1939 | Chesnut | 333/16 |
| 2,758,281 | 8/1956 | Carleson | 333/16 |
| 3,510,793 | 5/1970 | Barber | 333/16 |

*Primary Examiner*—Donald D. Forrer
*Assistant Examiner*—Harold A. Dixon
*Attorney*—Mason, Mason & Albright

[57] ABSTRACT

An amplifier arrangement includes an amplifier and a feed back system for maintaining the amplifier operating at a direct point on a non-linear part of its characteristic. The feed back system includes a generator for adding a pilot signal to the main input signal to the amplifier and a detector for detecting the amplified pilot signal. The amplitude of the amplified pilot signal will depend upon the operating point of the amplifier in its characteristic. By comparing the amplified pilot signal with a reference signal representative of a desired point in the amplifier characteristic, the amplitude of the main input signal is varied to maintain the amplifier operating at the desired point.

7 Claims, 2 Drawing Figures

Figures 1, 2:
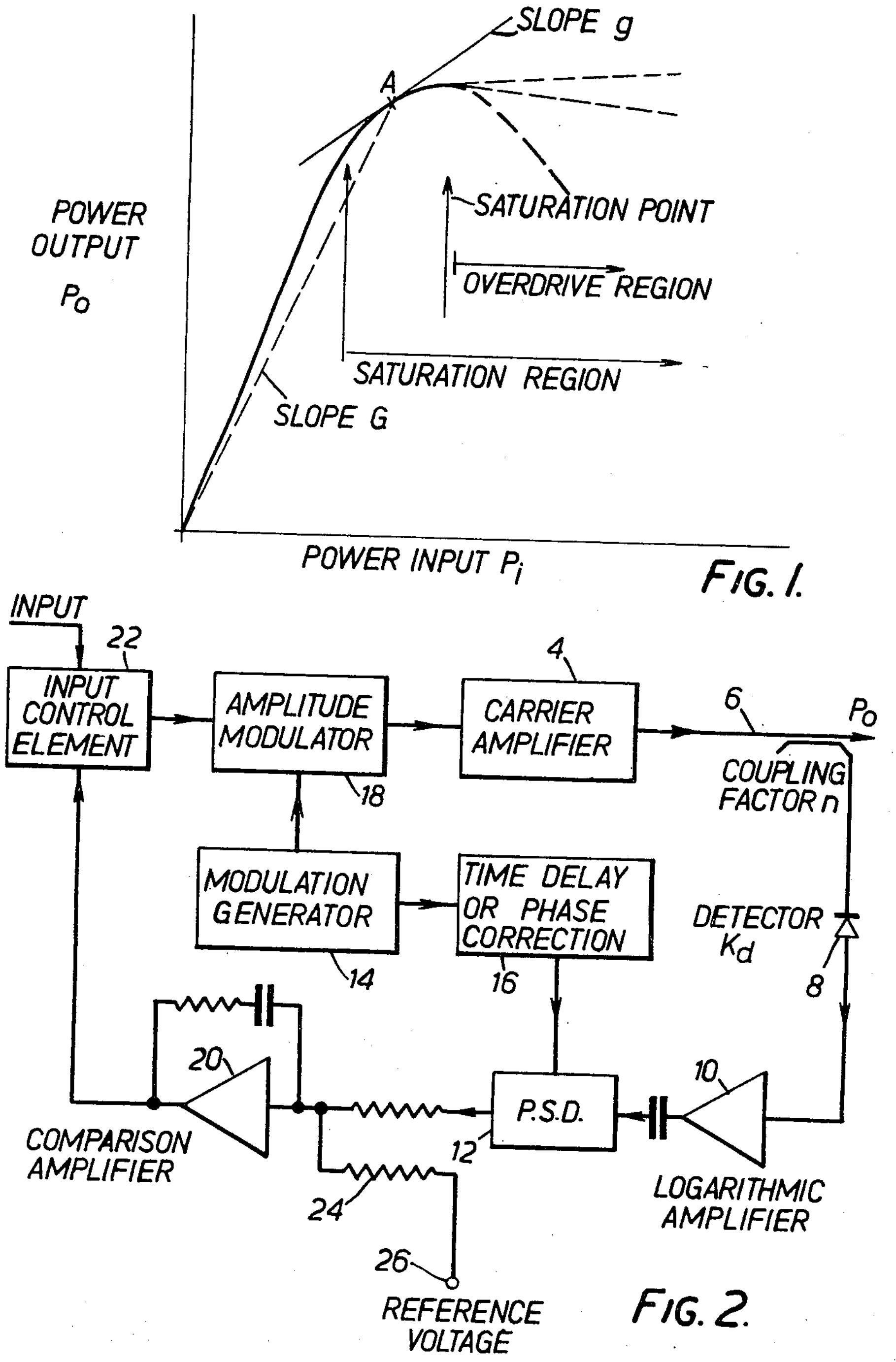

INVENTORS
PERCY JOHN FISH
MALCOLM BABINGTON CLARK
BY Mason, Mason & Albright
ATTORNEYS

FEEDBACK CONTROL SYSTEMS

The present invention relates to feedback control systems, such as for controlling electrical amplifiers.

In an embodiment of the invention to be described in detail there is proposed a control system for maintaining an amplifier operating at a predetermined point in the saturation region of its characteristic, comprising generating means operative to add an incremental component to an input signal which is to be fed to the amplifier, sensing means responsive to that part of the amplifier output signal representing the amplified value of the said component to derive therefrom a slope signal which is representative of the slope at the point on its characteristic at which the amplifier is operating, reference means providing a reference signal representative of the slope at the said predetermined point on the characteristic, means for comparing the slope signal and the reference signal, and control means responsive to the difference, if any, sensed by the comparing means to control the main input signal to the amplifier in a sense such as to tend to reduce the difference to zero.

A feedback control system embodying the invention, will now be described, by way of example with reference to the accompanying diagrammatic drawing in which:

FIG. 1 is the input/output power characteristic of an amplifier included in the system; and FIG. 2 is a block diagram of the system.

FIG. 1 shows the input/output power characteristic of a carrier wave amplifier (see FIG. 2). As will be seen, the output power $P_o$ of the amplifier reaches a maximum value when the input power $P_i$ reaches a predetermined value. At this point the amplifier is saturated and any further increase in input power will generally result in a decrease in output power.

It will be assumed that it is required to operate the amplifier at a point A on the characteristic, this point being in the saturation region but just before the point of complete saturation. The overall gain of the amplifier when operating at this point is G, that is the slope of a line extending from the origin O to the point A. The incremental gain at point A is g, that is the slope of the tangent to the characteristic at point A.

Thus $$P_{ol} = G.P_{il} \qquad (1)$$

where $P_{ol}$ is a fixed value of power output in response to a fixed value $P_{il}$ of power input.

Thus $$P_o = P_{ol} + \delta P_o = G.P_{il} + g.\delta P_i \qquad (2)$$

where $\delta P_o$ and $\delta P_i$ respectively are increments in output and input power $P_{ol}$ and $P_{il}$.

As shown in FIG. 2 the feed back control system includes an amplitude modulator 18 for impressing a pilot signal in the form of a small amplitude modulation on a carrier wave signal before it is applied to the carrier amplifier 4. The amplitude modulator 18 is controlled by a modulation generator 14. A coupler 6, having a coupling factor n, and a detector 8 are arranged to sense the magnitude of the output power $P_o$ from the carrier amplifier 4, and the detected signal is amplified in a logarithmic amplifier 10. The output of the logarithmic amplifier 10 is supplied to a phase sensitive detector 12 which is controlled by the modulation generator 14. An adjustment circuit 16 is provided to adjust the phase of, or to cause a short time delay in, the signal from the modulation generator 14 which is applied to the phase sensitive detector. The output from the detector 12 is fed to an integrating amplifier 20 as is a reference voltage $V_R$ which is supplied from a terminal 26 through a resistor 24. The output of the amplifier 20 is then used to operate a control element 22, for example a P.I.N. diode, which controls the input power of the signal supplied via the amplitude modulator 18 to the carrier amplifier 4.

In operation the modulator generator 14 impresses a small sinusoidal signal on the carrier so that the power applied to the carrier amplifier 4 is in the following form:-

$$pi = P_{il}\ (1 + a.\ \sin w_m t) \qquad (3)$$

where $A$ = amplitude of the sinusoidal signal and $w_m = 2\ \pi$ fm where fm is the frequency of the modulator generator signal.

The output from the amplifier 4 is then detected by the detector 8, which operates according to a square law and therefore detects power in terms of voltage, through the coupler 6. Thus the output voltage, $V_d$, from the detector is given by the equation:

$$V_d = n.K_d.G.P_{il} + n.K_d.\ g.P_{il}\ \text{a.sin}\ w_m t \qquad (4)$$

where $n$ = coupling factor of the coupler 6 and $K_d = a$ constant representative of detector sensitivity.

Since the input modulation supplied by the modulator 18 is small, it can for practical purposes be regarded as incremental. Thus the incremental change, $\delta V_d$, in detector voltage resulting from the small signal supplied by the modulator 18 can be represented by the equation $$\delta V_d = n.K_d.g.P_{il}.a.\ \sin w_m t \qquad (5)$$

The output voltage $V_o$ from the logarithmic amplifier 10 is given by the following equation $$V_o = (V_{ol} + \delta V_o) = K_g \log_o V_d \qquad (6)$$

where $K_g$ is the gain of the logarithmic amplifier.

Differentiating equation 7, $$d\ V_o / d\ V_d = K_g / V_d \qquad (7)$$

Therefore, $\delta V_o = \delta V_d\ K_g / V_d$ (8)

If $\delta V_d$ is small, equation 4 can be written $$V_d = n.K_d.G.P_{il} \qquad (9)$$

Now, substituting from equations 5 and 9, $$\delta V_0 = \frac{n \cdot K_d \cdot K_g \cdot g \cdot P_{il} a \cdot \sin w_{mt}}{n \cdot K_d \cdot G \cdot P_{il}}$$

$$= K_g \frac{g}{G} a \sin w_{mt} \ . \ . \ . \qquad (10)$$

Thus the dependence upon $P_i$ has been removed. The term G can be regarded as constant since the operating point A of the system is fixed.

Now, as will be seen from FIG. 1, the term $g$ can become negative if the amplifier is caused to operate in a saturated condition, and in order therefore, to prevent positive feedback occurring in the system as a result of a change in sign of the term $g$, the output signal $\delta V_o$ from the logarithmic amplifier is fed into the phase sensitive detector 12. (The $V_{ol}$ term, see equation 7, is not passed to the detector 12 because of the output capacity of the amplifier). The phase sensitive detector, in addition to sensing whether the term $g$ is positive or negative, also removes thermal noise and any other modulation which has been applied to the carrier signal. The adjustment circuit 16 is provided to compensate for any delay caused to the modulation signal in travelling along the path through the carrier amplifier 4, the coupler 6, the detector 8, and the logarithmic amplifier 10.

The detector 12 operates by multiplying the term $\delta V_o$ by the factor of Sin $w_m t$ so that the output voltage $V_{pd}$ from the detector is given by $$V_{pd} = \pm K_g.g/\ G.a.\ \text{Sin}^2\ w_m t.$$

the sign depending on whether $g$ is positive or negative, or, $$V_{pd} = \pm K_g/2.\ g/G.\ a.(1 - \text{Cos}\ 2\ w_m t) \qquad (11)$$

This latter signal is then fed into the integrating amplifier 20 which attenuates the term containing Cos 2 $w_m t$.

The reference voltage $V_R$ is made equal to $$K_g/2.g_1/G.a \qquad (12)$$

where $g_1$ is the fixed value of $g$ at a particular point A in the characteristic of FIG. 1, $G$ being assumed to be constant, and amplifier 20 produces an output dependent on the difference between its two inputs, ignoring the term containing Cos 2 $w_m t$ which has been attenuated. Therefore, the output from the amplifier 20, is $$K_g/2G(g_1 - g) \qquad (13)$$

that is, it is representative of the difference between the desired and actual operating points of the amplifier 4. This signal is then fed to the input control element 22 so as to adjust the input power until the amplifier 4 operates at its desired point, that is, when $$g_1 = g$$

In a modification, the modulation generator can be arranged to modulate the carrier amplitude instead of the power. In this case the detector would be arranged to operate in accordance with a linear law rather than a square law and the reference voltage $V_R$ would be altered accordingly.

The modulation frequency or even waveform of the modulation generator is chosen for a particular carrier in such a way that the information-carrying-modulation on the carrier would not be distorted or deteriorate as a result of the modulation; for example a random or semi-random waveform could be used.

The feed back control system can also be used to control pulsed input signals. Then if the pulses are too short for the gain control loop to be effective within one pulse duration, the feed back and reference signals could be gated into the integrating amplifier in synchronism with the pulses so as to provide a control signal which is averaged over several pulses. Preferably, the modulation generator is then used to generate alternative positive and negative pulses so as to avoid synchronous gating out of the control modulation by the pulse timing.

The input control element 22 and the amplitude modulator 18 can comprise a single unit provided that the depth of modulation imposed upon the input signal is not affected by the control signal.

The power optimisation system is particularly useful when the carrier amplifier comprises a travelling wave tube in a travelling wave system, since in such travelling wave tubes the saturation level of the tube varies markedly with frequency and thus the feed back control system maintains the travelling wave tube close to saturation regardless of variations in frequency or input power.

WE CLAIM:

1. An amplifier arrangement comprising,
 an amplifier having an input for receiving an input signal and an output, and
 a feed back control system connected between the output and input of the amplifier for maintaining the amplifier operating at a predetermined point in the non linear region of its characteristic, the control system including,
 generating means connected to the input of the amplifier to add an incremental component to the input signal before it is amplified by the amplifier,
 sensing means connected to the output of the amplifier to selectively sense the incremental component after amplification by the amplifier and to derive therefrom a first signal the amplitude of which is representative of the instantaneous slope at the point in the non linear region of its characteristic at which the amplifier is operating,
 reference means for providing a reference signal the amplitude of which is representative of the instantaneous slope at the predetermined operating point of the amplifier,
 comparing means connected to the sensing means and the reference means to provide an output representative of the difference in amplitude if any between the first signal and the reference signal, and
 control means connected to receive the output of the comparing means and the input signal and operative to modify the amplitude of the input signal in such a sense as to tend to reduce the output from the comparing means to zero.

2. An arrangement according to claim 1, wherein the sensing means includes,
 logarithmic amplification means for amplifying the sensed signal, and
 a phase-sensitive detector having first and second inputs, said first input being connected to the output of the amplification means and the second input being connected to the generating means, the generating means providing a phase reference signal for the detector whereby the detector selects the amplified incremental component from the sensed signal.

3. An arrangement according to claim 1, wherein the control means comprises a P.I.M. diode.

4. An arrangement according to claim 1, wherein the comparing means comprises an integrating amplifier.

5. An arrangement according to claim 1, wherein said generating means includes a modulator for sinusoidally modulating the input signal and wherein said sensing means includes a detector connected to the output of the amplifier, the detector operating in accordance with a square law to produce an output voltage which is proportional to the power output of the amplifier.

6. An arrangement according to claim 1, for use with a pulsed input signal, including
 means for receiving the input signal and having an output connected to the comparing means to gate the comparing means in synchronism with the input signal so that the difference signal is averaged over a plurality of pulses.

7. An arrangement according to claim 6 wherein the generating means is operable to generate alternatively positive and negative incremental components in synchronism with the input pulses.

* * * * *